US008762967B2

(12) United States Patent
Kim et al.

(10) Patent No.: US 8,762,967 B2
(45) Date of Patent: Jun. 24, 2014

(54) PROGRAM COMPILER, PROGRAM INSTALLER, AND PROGRAM INSTALL METHOD

(75) Inventors: Min-Chan Kim, Suwon-si (KR); Jae-Hoon Jeong, Yongin-si (KR); Joo-Young Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 12/971,283

(22) Filed: Dec. 17, 2010

(65) Prior Publication Data

US 2011/0239199 A1 Sep. 29, 2011

(30) Foreign Application Priority Data

Mar. 23, 2010 (KR) .................. 10-2010-0025914

(51) Int. Cl.
*G06F 12/02* (2006.01)

(52) U.S. Cl.
USPC .......................................... 717/140; 717/174

(58) Field of Classification Search
USPC ........................................................ 717/140
See application file for complete search history.

(56) References Cited

U.S. PATENT DOCUMENTS

| | | | | |
|---|---|---|---|---|
| 6,157,948 | A * | 12/2000 | Inoue et al. | 709/219 |
| 7,181,646 | B2 | 2/2007 | Kano | |
| 7,440,966 | B2 | 10/2008 | Adkins et al. | |
| 2005/0003810 | A1 * | 1/2005 | Chu et al. | 455/418 |
| 2005/0114871 | A1 * | 5/2005 | Wolff et al. | 719/331 |
| 2005/0182797 | A1 * | 8/2005 | Adkins et al. | 707/200 |
| 2009/0182929 | A1 * | 7/2009 | Hwang et al. | 711/6 |
| 2010/0293532 | A1 * | 11/2010 | Andrade et al. | 717/140 |

FOREIGN PATENT DOCUMENTS

| | | |
|---|---|---|
| EP | 0 866 612 A1 | 9/1998 |
| JP | 2005-100373 | 4/2005 |
| JP | 2005-228329 | 8/2005 |
| JP | 2008-003815 | 1/2008 |
| JP | 2009-151386 | 7/2009 |
| KR | 10-2009-0025204 | 3/2009 |
| WO | WO 2007/130209 | 11/2007 |

OTHER PUBLICATIONS

Duell, The Design and Implementation of Berkeley Lab's Linux Checkpoint/Restart, Lawrence Berkeley National Laboratory (Published 2003) retrieved from http://citeseerx.ist.psu.edu/viewdoc/download?doi=10.1.1.106.2346&rep=rep1&type=pdf on Aug. 24, 2013.*
"Linux Checkpoint/Restart," pp. 1-2, URL: https://ckpt.wiki.kernel.org/index.php/Main_Page.

(Continued)

*Primary Examiner* — Don Wong
*Assistant Examiner* — Theodore Hebert
(74) *Attorney, Agent, or Firm* — NSIP Law (57) ABSTRACT

A program installation apparatus may install a program in an immediately executable form using a snapshot image. The snapshot image may store a partially executed result of the program. A snapshot point at which the snapshot image is created may be decided by analyzing dependency on a system execution environment of the program. The program installation apparatus may, in advance, execute a part of the program having no dependency on the system execution environment to create a snapshot image and then execute the remaining part of the program based on the snapshot image, reducing a start-up time of the program.

47 Claims, 6 Drawing Sheets

(56) References Cited

OTHER PUBLICATIONS

Jelinek, Jakub, "prelink(8)—Linux man page," pp. 1-4, URL: http://linux.die.net/man/8/prelink.

Extended European Search Report issued Sep. 7, 2011, in counterpart European Patent Application No. 11158003.1 (6 pages, in English).

* cited by examiner

PROGRAM COMPILER, PROGRAM INSTALLER, AND PROGRAM INSTALL METHOD

CROSS-REFERENCE TO RELATED APPLICATION(S)

This application claims the benefit under 35 U.S.C. §119(a) of Korean Patent Application No. 10-2010-0025914, filed on Mar. 23, 2010, the entire disclosure of which is incorporated herein by reference for all purposes.

BACKGROUND

1. Field

The following description relates to a program install technique to improve a program execution speed.

2. Description of the Related Art

Execution of programs incurs processing costs. Processing costs in relation to program execution includes a cost for loading the program from a hard disk drive (HDD) to a Random Access Memory (RAM), a cost for loading a library associated with the program, a cost for relocating a shared library associated with the program, a cost for executing initialization functions before a main function of the program appears, and so on.

Recently, in light of developments in artificial intelligence, the volume, complexity of programs, and costs for program execution are dramatically increasing and accordingly attentions are focused on reducing such program execution costs.

A representative method for reducing costs for program execution is to use storage with good input/output performance. For example, a Solid State Drive (SSD) having better input/output performance than HDD improves the speed at which programs are loaded to RAM. Specifically, with regards to mobile products, quick responsiveness is an important factor, as opposed to processing performance, in order to immediately cope with a user's demands.

Related technologies include prelinking, which completely relocates a program before execution of the program. Prelinking predicts a loading address of a shared library associated with the program to change the addresses of functions to have to be relocated in advance. Relocation is performed when the shared library fails to be loaded to the predicted loading address. However, prelinking cannot eliminate a cost to call initialization functions that are repeatedly called whenever a program is executed. Checkpoint/resume migrates programs to handle server load distribution or sever failure, which is directed to suspend/resume each application program. However, checkpoint/resume has a limited environment for suspending.

The more intelligent application programs are, the longer their startup latencies. The is because an increase in volume of programs deepens structural modulization, which increases a relocation cost for starting up programs, an I/O cost for reading up pages, a call cost for repeatedly calling initialization functions for every program execution, and so on. The relocation cost among the costs is due to a shared library which is used to reduce memory footprints in a General Purpose Operating System (GPOS) environment that have different, independent address spaces and use virtual addresses.

A system which uses a nonvolatile memory as a main memory may store application programs or shared libraries in the main memory. Since the nonvolatile memory has excellent I/O performance compared to a secondary storage, such as HDD, SSD, Flash, and the like, the system has less I/O cost. However, the system cannot still reduce costs for reallocation and repeatedly calling initialization functions every program execution.

SUMMARY

In one general aspect, there is provided a program installation and execution apparatus, including: a snapshot point setting unit configured to set a particular location on an execution sequence of a program to a snapshot point, a first execution unit configured to execute the program up to the snapshot point, and a snapshot image storage unit configured to store an execution result of the program up to the snapshot point.

The program installation and execution apparatus may further include: a snapshot image loading unit configured to load an execution result of the program, and a second execution unit configured to execute a remaining part of the program after the snapshot point of the program, based on the snapshot image.

In the program installation and execution apparatus, the snapshot point setting unit is further configured to: detect a part having substantial dependency on a system execution environment from the execution sequence of the program, and decide a setting location of the snapshot point, based on the detected part.

In the program installation and execution apparatus, the snapshot point setting unit is further configured to decide a setting location of the snapshot point in consideration of an execution order of an initialization function using a system call.

In the program installation and execution apparatus, the initialization functions include: global class creators executed or called before a main function is executed, and initialization functions of a shared library.

In the program installation and execution apparatus, the snapshot point setting unit includes: a dependency analysis unit configured to detect a part having substantial dependency on a system execution environment, from the execution sequence of the program, according to whether or not the part uses a system call, and a rearrangement unit configured to adjust an execution order of the part having substantial dependency on the system execution environment.

In the program installation and execution apparatus, the program includes: an independent function having no dependency on the system execution environment, and a dependent function having dependency on the system execution environment, and the rearrangement unit is further configured to adjust execution orders of the independent function and the dependent function such that the independent function is executed or called before the dependent function.

In the program installation and execution apparatus, the program includes an installed program or an updated program.

In the program installation and execution apparatus, an execution result of the program includes at least one of registry information and memory information of the program executed up to the snapshot point.

In the program installation and execution apparatus, an execution result of the program is stored in a non-volatile memory.

In another general aspect, there is provided a program compiler, including: a dependency analysis unit configured to detect a part having substantial dependency on a system execution environment, from an execution sequence of a program, according to whether or not the part uses a system call, and a rearrangement unit configured to adjust an execution order of the part having substantial dependency on the system execution environment.

In another general aspect, there is provided a program installation and execution method, including: setting a particular location on an execution sequence of a program to a snapshot point, executing the program up to the snapshot point, and storing an execution result of the program up to the snapshot point.

In the program installation and execution method, loading the execution result of the program, and executing the remaining part of the program after the snapshot point of the program, based on the loaded execution result of the program.

In the program installation and execution method, the setting of the snapshot point includes: detecting a part having substantial dependency on a system execution environment from the execution sequence of the program, and deciding a setting location of the snapshot point based on the detected part.

In the program installation and execution method, setting of the snapshot point includes deciding a setting location of the snapshot point in consideration of an execution order of an initialization function using a system call.

In the program installation and execution method, the initialization functions include: global class creators executed or called before a main function is executed, and initialization functions of a shared library.

In the program installation and execution method, the program includes: an independent function having no dependency on the system execution environment, and a dependent function having dependency on the system execution environment, and the setting of the snapshot point includes deciding a setting location of the snapshot point after adjusting execution orders of the independent function and the dependent function such that the independent function is executed or called before the dependent function.

In the program installation and execution method, the program includes an installed program or an installed, updated program.

In the program installation and execution method, the execution result of the program includes registry information and memory information of the program executed up to the snapshot point.

In the program installation and execution method, the execution result of the program is stored in a non-volatile memory.

In the program installation and execution method, the program is executed upon installation of the program to create the snapshot image at an arbitrary time after relocation of the program.

In the program installation and execution method, existing snapshot images are updated and recreated in response to the program being updated.

In the program installation and execution method, existing snapshot images are invalidated in response to the program being updated.

In the program installation and execution method, snapshot timing is decided based on a system call of the program.

In the program installation and execution method, a programmer is permitted to correct a source and provide a hint in order to inform the occurrence timing of a system call.

In the program installation and execution method, the occurrence location of a system call is informed using a source/binary static analysis tool.

In the program installation and execution method, the occurrence of a system call is checked through a system call interface of an operating system.

In the program installation and execution method, initialization functions are relocated to delay a snapshot timing.

In the program installation and execution method, a programmer is permitted to correct and newly build a source in order to relocate initialization functions.

In the program installation and execution method, an automation tool is newly built using a static analysis tool in order to relocate initialization functions.

In the program installation and execution method, a program binary is corrected to relocate initialization functions.

In the program installation and execution method, a snapshot image is recreated upon restarting in response to the snapshot image having been invalidated.

In another general aspect, there is provided a computer-readable information storage medium for causing a computer to implement a program installation and execution method, including: setting a particular location on an execution sequence of a program to a snapshot point, executing the program up to the snapshot point, and storing an execution result of the program up to the snapshot point.

The computer-readable information storage medium may further include: loading the execution result of the program, and executing the remaining part of the program after the snapshot point of the program, based on the loaded execution result of the program.

In the computer-readable information storage medium, the setting of the snapshot point includes: detecting a part having substantial dependency on a system execution environment from the execution sequence of the program, and deciding a setting location of the snapshot point based on the detected part.

In the computer-readable information storage medium, the setting of the snapshot point includes deciding a setting location of the snapshot point in consideration of an execution order of an initialization function using a system call.

In the computer-readable information storage medium, the initialization functions include: global class creators executed or called before a main function is executed, and initialization functions of a shared library.

In the computer-readable information storage medium, the program includes: an independent function having no dependency on the system execution environment, and a dependent function having dependency on the system execution environment, and the setting of the snapshot point includes deciding a setting location of the snapshot point after adjusting execution orders of the independent function and the dependent function such that the independent function is executed or called before the dependent function.

In the computer-readable information storage medium, the program includes an installed program or an installed, updated program.

In the computer-readable information storage medium, the execution result of the program includes registry information and memory information of the program executed up to the snapshot point.

In another general aspect, there is provided a program execution apparatus, including: a snapshot point setting unit configured to set a particular location on an execution sequence of a program to a snapshot point, a first execution unit configured to execute the program up to the snapshot point, and a second execution unit configured to execute a remaining portion of the program after the snapshot point of the program.

In the program execution apparatus, the program includes: an independent function having no dependency on a system execution environment, and a dependent function having dependency on the system execution environment, and the program execution apparatus further includes a rearrangement unit configured to adjust execution orders of the independent function and the dependent function such that the independent function is executed or called before the dependent function.

In the program execution apparatus, the program includes an installed program or an updated program.

In the program execution apparatus, an execution result of the program includes at least one of registry information and memory information of the program executed up to the snapshot point.

The program execution apparatus, an execution result of the program is stored in a non-volatile memory.

In another general aspect, there is provided a program execution method, including: setting a particular location on an execution sequence of a program to a snapshot point, executing the program up to the snapshot point, and executing a remaining portion of the program after the snapshot point of the program.

In the program execution method, the program includes: an independent function having no dependency on a system execution environment, and a dependent function having dependency on the system execution environment, and adjusting execution orders of the independent function and the dependent function such that the independent function is executed or called before the dependent function.

In the program execution method, the program includes an installed program or an updated program.

In the program execution method, an execution result of the program includes at least one of registry information and memory information of the program executed up to the snapshot point.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
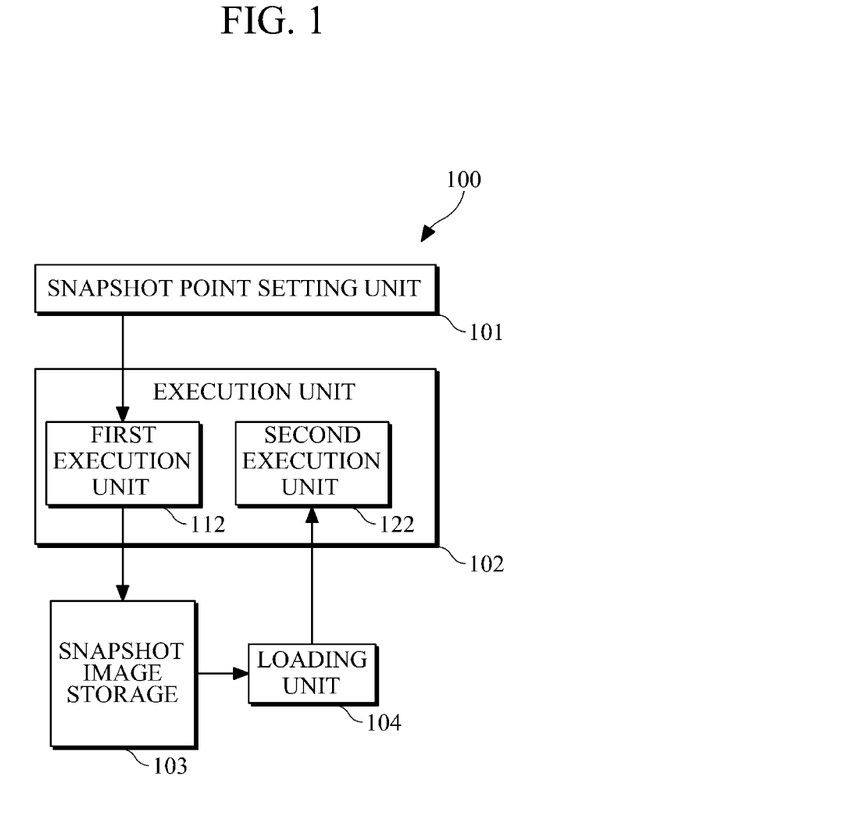
FIG. 1 is a diagram illustrating an example of a program installation and execution apparatus.

FIG. 1 is a diagram illustrating an example of a program installation and execution apparatus 100.

Referring to FIG. 1, the program installation and execution apparatus 100 may include a snapshot point setting unit 101, an execution unit 102, a snapshot image storage unit 103, and a loading unit 104.

The snapshot point setting unit 101 may set a particular location of a program execution sequence to a snapshot point.

A snapshot point corresponds to a location up to which a program is executed. For example, in response to the execution unit 102 executing a program including a series of functions (or codes), the execution unit 102 may execute the program up to a snapshot point that has been set according to a control instruction from the snapshot point setting unit 101.

The snapshot point setting unit 101 may detect a part dependent on a system execution environment from the program execution sequence. The snapshot point setting unit 101 may decide a setting location of a snapshot point according to the detected part dependent on the system execution environment.

The system execution environment may be an operating system or an initial value input to the program and the part dependent on the system execution environment may be functions or codes that are influenced by the initial input value, and the like. For example, when it is presumed that a certain program is executed in the order of A, B, C, and D functions and the C function is dependent on a system execution environment, the snapshot point setting unit 101 may decide a location at which execution of the B function is complete or at which execution of the C function starts, as a setting location of a snapshot point.

The snapshot point setting unit 101 may detect a part dependent on the system execution environment according to which function constructing the program uses a system call. For example, the snapshot point setting unit 101 may analyze functions constructing the program to detect a function using a system call, and may determine a part at which the function using the system call is executed as a part dependent on the system execution environment.

The first execution unit 112 may execute the program up to the snapshot point set by the snapshot point setting unit 101. For example, in response to a certain program being executed in the order of A, B, C, and D functions and a location at which execution of the B function is complete or at which execution of the C function starts is set to a snapshot point, the first execution unit 112 may execute only the A and B functions of the program.

The snapshot image storage unit 103 may create a snapshot image which is the partially executed result of the program executed by the first execution unit 112, and may store the snapshot image. The snapshot image may include a value corresponding to the partially executed result of the program, registry information, memory information, and the like. The snapshot image may be stored in a nonvolatile memory, such as a Phase-change Random Access Memory (PRAM), a Magnetic Random Access Memory (MRAM), a Ferroelectric Random Access Memory (FRAM), etc. These are nonlimiting examples.

The loading unit 104 may load the snapshot image from the snapshot image storage unit 103. The loading unit 104 may load, in response to receiving an execution request or an execution instruction from a user, the snapshot image.

The second execution unit 122 may execute the remaining part of the program. That is, the second execution unit 122 may execute the program part after the snapshot point based on the snapshot image loaded by the loading unit 104. For example, in response to a certain program being executed in the order of A, B, C, and D functions and a location at which execution of the B function is complete or at which execution of the C function starts is set to a snapshot point, the first execution unit 112 may execute the A and B functions of the program in response to the program being installed, and then the second execution unit 122 may execute the remaining C and D functions in response to an execution instruction from a user after the program is installed.

In this way, the program installation and execution apparatus 100 may install a program in an immediately executable form. That is, since the location of a snapshot point may be decided in consideration of a system execution environment, the corresponding program may be executed in advance up to the snapshot point as soon as the program is installed, and then the remaining program part after the snapshot point may be executed based on a snapshot image in response to an execution request. Accordingly, a start-up time of an installed program or an updated, reinstalled program may be reduced.

Figure 2:
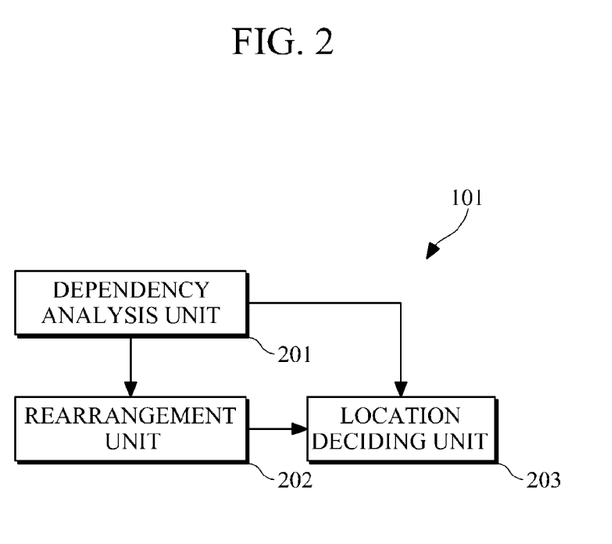
FIG. 2 is a diagram illustrating an example of a snapshot point setting unit.

FIG. 2 is a diagram illustrating an example of the snapshot point setting unit 101.

Referring to FIG. 2, the snapshot point setting unit 101 may include a dependency analyzer 201, a rearrangement unit 202, and a location deciding unit 203.

The dependency analyzer 201 may analyze dependency of functions or codes constructing a program on a system execution environment.

In the current example, functions or codes having dependency on a system execution environment are referred to as "dependent functions," and functions or codes having no dependency on a system execution environment are referred to as "independent functions." In response to a certain program including a main function and initialization functions appearing before the main function appears, the initialization functions may be classified into independent functions and dependent functions according to dependency on a system execution environment. The initialization functions may be global class creators to be executed or called before a main function is executed, initialization functions of a shared library, or the like. Whether a certain initialization function is an independent function or a dependent function may be determined according to whether or not the initialization function uses a system call. For example, if a path of a certain function is decided depending on the volume of a system memory, the function may be a dependent function that is influenced by a system execution environment.

The dependency analysis unit 201 may detect a part dependent on the system execution environment from a program execution sequence according to which part of the program execution sequence uses a system call.

The rearrangement unit 202 may change an execution sequence of initialization functions based on the dependency on the system execution environment of the initialization functions, which may have been analyzed by the dependency analysis unit 201, such that an initialization function having dependency on the system execution environment may be the latest executed.

For example, if it is presumed that there are initialization functions A, B, C, and D before a main function appears and the B function is a dependent function having dependency on a system execution environment, the rearrangement unit 202 may locate an execution call or order of the B function behind those of the A, C, and D functions.

The location deciding unit 203 may decide a setting location of a snapshot point based on the dependency on the system execution environment of the initialization functions and the execution sequence of the initialization functions adjusted by the rearrangement unit 202.

The location deciding unit 203 may decide a location at which execution of a dependent function starts as a setting location of a snapshot point. For example, if the execution sequence of the initialization functions is adjusted to an order of A function→C function→D function→B function by the rearrangement unit 202, the location deciding unit 203 may decide a location at which execution of the D function is complete or at which execution of the B function starts up, as a setting location of a snapshot point.

Figure 3:
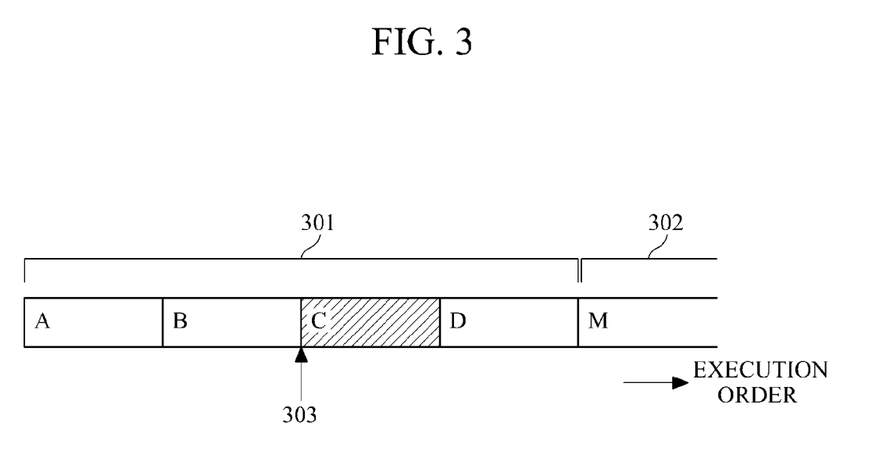
FIG. 3 is a view for explaining an example of a program execution sequence.

FIG. 3 is a view for explaining an example of a program execution sequence.

Referring to FIG. 3, the program may include initialization functions 301 and a main function 302.

The main function 302 may be a part to execute a main functionality of the program, and the initialization functions 301 may be global class creators or initial functions of a shared library, which may be executed or called before the main function 302 is executed.

In response to a program being installed, the snapshot point setting unit 101 may detect a part having dependency on a system execution environment from an execution sequence of the program. For example, the snapshot point setting unit 101 may analyze initialization functions including A, B, C, and D functions. That is, the snapshot point setting unit 101 may analyze which one of the A, B, C, and D functions uses a system call. If the C function uses a system call, the snapshot point setting unit 101 may detect the C function as a dependent function having dependency on the system execution environment.

After detecting a part having dependency on the system execution environment, the snapshot point setting unit 101 may set a snapshot point 303, which is a partial execution location of the program, according to the part having dependency on the system execution environment. For example, the snapshot point setting unit 101 may set an execution start-up location of the C function detected as a dependent function to the snapshot point 303.

In response to the snapshot point 303 being set, the first execution unit 112 may execute the program up to the snapshot point 303. For example, the first execution unit 112 may execute the A and B functions among the initialization functions 301.

After the program is executed up to the snapshot point 303, the partially executed results of the program may be created as a snapshot image and stored. For example, the snapshot image storage unit 103 may create the execution results of the A and B functions, registry information and memory information, as a snapshot image, and may store the snapshot image in a non-volatile memory.

Thereafter, in response to a program execution request or instruction being received from a user, the loading unit 104 may load the stored snapshot image, and the second execution unit 122 may execute the C and D functions and main function based on the snapshot image.

Figure 4A:
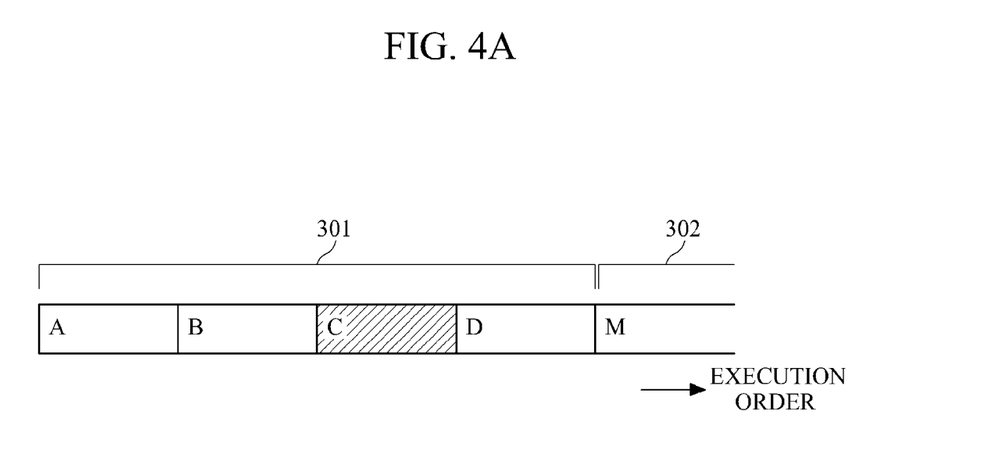
FIGS. 4A and 4B are views for explaining other examples of program execution sequences.
Figure 4B:
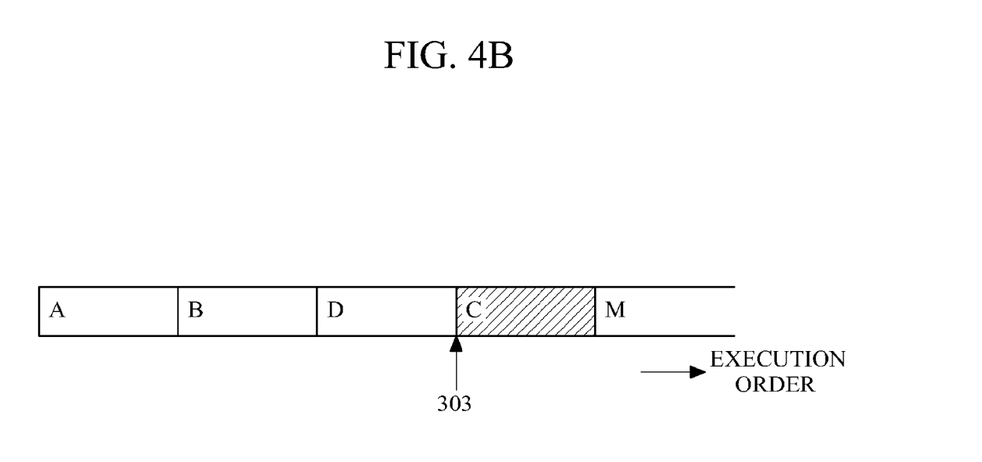

FIGS. 4A and 4B are views for explaining other examples of program execution sequences.

Referring to FIG. 4A, the program may include initialization functions 301 and a main function 302. The initialization functions 301 and main function 302 have been described above with reference to FIG. 3.

Referring to FIGS. 2 and 4A, in response to a program being installed, the dependency analysis unit 201 may detect a part having dependency on a system execution environment from an execution sequence of the program. For example, the snapshot point setting unit 101 may analyze initialization functions including A, B, C, and D functions. That is, the snapshot point setting unit 101 may analyze which one of the A, B, C, and D functions uses a system call. In response to the C function using a system call, the snapshot point setting unit 101 may detect the C function as a dependent function having dependency on the system execution environment.

After the dependent function C is detected, the rearrangement unit 202 may adjust the execution sequence of the initialization functions 301. For example, as illustrated in FIG. 4B, the rearrangement unit 202 may change the execution order of the C function such that the C function is executed later than the D function.

In FIG. 4B, after the execution sequence of the initialization functions 301 is adjusted, the location deciding unit 203 may decide a setting location of a snapshot point 303 according to the dependent function C detected by the dependency analysis unit 201. For example, the location deciding unit 203 may set an execution start-up time of the C function as the snapshot point 303.

In this way, the program installation and execution apparatus 100 may execute and install a part of a certain program, having no dependency on a system execution environment, in advance, and then may execute the remaining part of the program immediately in response to receiving an execution request, reducing an initial start-up time of the program. In addition, the program installation and execution apparatus 100 may adjust the execution sequence of initialization functions, further reducing the start-up time of the program.

Figure 5:
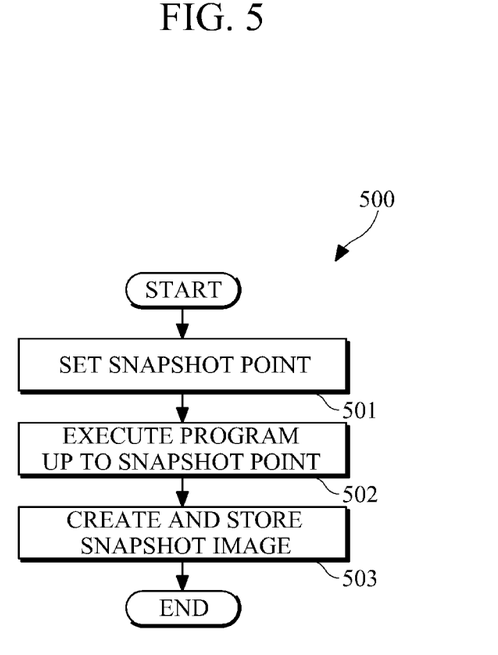
FIG. 5 is a flowchart illustrating an example of a program installation method.

FIG. 5 is a flowchart illustrating an example of a program installation method 500.

Referring to FIG. 5, the program installation method 500 may be applied to both situations of a certain program being newly installed, and the program being updated and reinstalled.

The program installation method 500 may start in response to a program being installed according to a program installation instruction or a program update instruction. For easier understanding, general installation of storing various codes of a program in a system is referred to as a "first installation process." That is, the program installation method 500 may start in response to the first installation process being complete.

In operation 501, after the first installation process is complete, a second installation process may start. According to the second installation process, the program installation method 500 may set a snapshot point. The snapshot point may be a partial execution point of the program installed through the first installation process. For example, the snapshot point setting unit 101 may analyze which initialization function uses a system call, and may set a start location of a part dependent on a system execution environment as a snapshot point.

In operation 502, the program installation method 500 may execute the program up to the snapshot point. For example, the first execution unit 112 may, in advance, execute a part of the program installed through the first installation process, the part having no dependency on the system execution environment.

In operation 503, the program installation method 500 may create and store the partially executed result of the program up to the snapshot point, as a snapshot image. For example, the snapshot image storage unit 103 may store a value corresponding to the partially executed result of the program, registry information and memory information in a non-volatile memory.

Since the snapshot point may be set based on the part dependent on the system execution environment, through the second installation process, the part having no dependency on the system execution environment may be executed in advance, and then the program may be installed in an immediately executable form.

Figure 6:
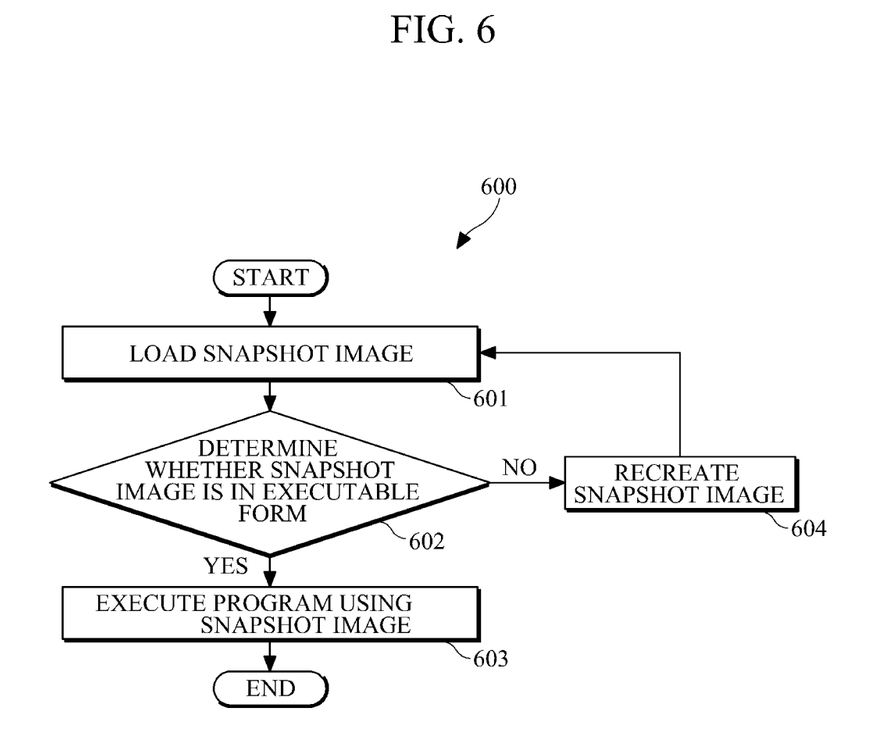
FIG. 6 is a flowchart illustrating an example of a program execution method.

FIG. 6 is a flowchart illustrating an example of a program execution method 600.

Referring to FIG. 6, the program execution method 600 may start in response to a user's execution request or instruction after a program has been installed through the process described above with reference to FIG. 5. Alternatively, the program execution method 600 may be executed upon installation of the program to create the snapshot image at an arbitrary or a predetermined time after relocation of the program.

Referring to FIGS. 1 and 6, in operation 601, the program execution method 600 may load a snapshot image in response to a user's execution request or instruction. For example, the loading unit 104 may load the snapshot image from the snapshot image storage unit 103.

In operation 602, the program execution method 600 may determine whether the snapshot image is in an immediately executable form. In operation 603, in response to it being determined that the snapshot image is in an immediately executable form, a program may be executed using the snapshot image. For example, the second execution unit 122 may execute the remaining program part after the snapshot point based on the snapshot image. In operation 604, in response to it being determined that the snapshot image is not in an immediately executable form, a snapshot image may be recreated. The recreation of a snapshot image may be based on the process described above with reference to FIG. 5.

Existing snapshot images may be updated and/or recreated in response to the program being updated. Existing snapshot images may be invalidated in response to the program being updated. A snapshot image may be recreated upon restarting in response to the snapshot image having been invalidated. Snapshot timing may be decided based on a system call of the program.

A programmer may be permitted to correct a source, e.g., a source code, and may provide a hint in order to provide information about the occurrence timing of a system call. The occurrence location of a system call may be informed using a source/binary static analysis tool. The occurrence of a system call may be checked through a system call interface of an operating system. Initialization functions may be relocated to delay a snapshot timing. The programmer may be permitted to correct and/or newly build a source in order to relocate initialization functions. An automation tool may be newly built using a static analysis tool in order to relocate initialization functions. A program binary may be corrected to relocate initialization functions.

A source (e.g., source code) static analysis tool may be a process of searching for functions of calling a system call or library functions of indirectly calling a system call by parsing program sources, under a presumption that source codes of an application program have been provided in advance. A binary static analysis tool may be a process for searching functions of calling a system call or library functions of indirectly calling a system call by detecting a code section of an execution file format (e.g., ELF, COFF) of an application program to analyze an assembly language.

An automation tool may operate as follows:

1) Recompile source codes in a mode of calling specific functions whenever a function call occurs (for example, -finstrument-function in GCC);

GCC is GNU Compiler Collection. The GNU Compiler Collection includes front ends for C, C++, Objective-C, Fortran, Java, and Ada, as well as libraries for these languages (libstdc++, libgcj, . . . ). GCC was originally written as the compiler for the GNU operating system. The GNU system was developed to be 100% free software, free in the sense that it respects the user's freedom.

"-finstrument" is a GCC option which can insert instrument code in every function entry.

2) Execute a program and record, e.g., whenever the specific functions are called, the called functions;

3) Terminate the program when start-up of the program is complete;

4) Analyze the called functions, based on the source codes, and transfer a list of the corresponding functions to a linker when no problem occurs in executing the functions although a call sequence of the functions changes (e.g., when the functions are not parent and children functions, but constructor functions of a class); and 5) The linker may re-arrange the call sequence of the corresponding functions such that the functions are called later.

The developer may know in advance whether or not functions used by him or her are functions whose behavior changes according to the status of the system. Therefore, calling of such functions may be, just before the functions are called, informed to the system of an embodiment, by inserting a specific function into source codes of the corresponding functions or by allowing a programmer to declare the functions as a specific attribute on the source codes and inform a compiler of the fact that the functions are called, and the compiler may inform the system of whether or not the functions are functions whose behavior changes according to the status of the system, by inserting a specific function when compiling the functions.

Figure 7:
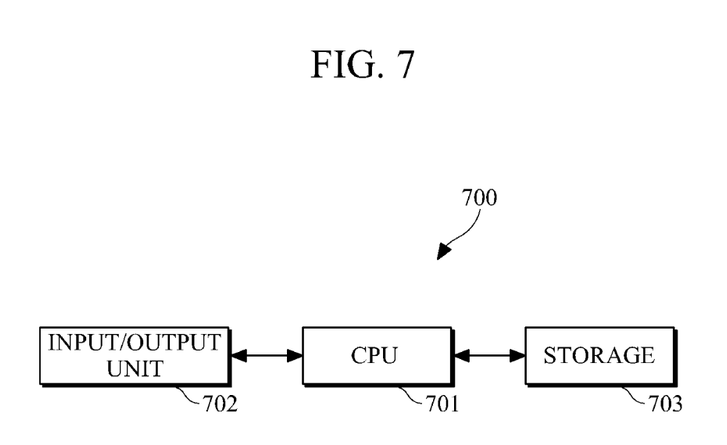
FIG. 7 is a diagram illustrating an example of a computing apparatus.

FIG. 7 is a diagram illustrating an example of a computing apparatus.

Referring to FIG. 7, the computing apparatus may include a CPU 701, an input/output unit 702, and a storage 703.

The CPU 701 may preliminarily store or install various codes of a program in response to the program is installed, may execute a part of the preliminarily installed program to create a snapshot image, may store the snapshot image, and may install the program.

The storage 703 may include a main memory and a hard disk. In one example, the main memory of the storage 703 may be a non-volatile memory. Accordingly, the snapshot image may be maintained even in response to a supply voltage being no longer supplied to the storage 703 after the snapshot image has been stored in the storage 703.

Also, the CPU 701 may execute the program using the snapshot image stored in the storage 703, and may provide the execution result of the program to a user through the input/output unit 702.

Figure 8:
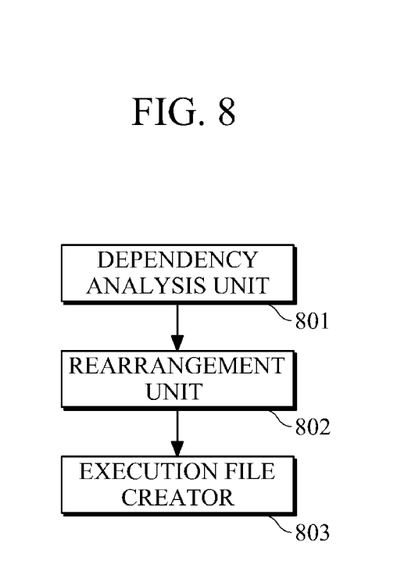
FIG. 8 is a diagram illustrating an example of program compiler.

FIG. 8 is a diagram illustrating an example of a program compiler 800.

Referring to FIG. 8, the program compiler 800 may include a dependency analysis unit 801, a rearrangement unit 802, and an execution file creator 803.

The dependency analysis unit 801 may analyze dependency on a system execution environment of functions or codes constructing a program. For example, the dependency analysis unit 801 may detect a dependent function dependent on a system execution environment according to which function constructing a program uses a system call.

The rearrangement unit 802 may adjust an execution sequence or a call sequence of functions such that a dependent function dependent on the system execution environment is the latest executed or called.

The execution file creator 803 may create an execution file of the program based on the adjusted execution sequence or call sequence of the functions.

Conventional Suspend-To-RAM/Hibernation techniques maintain the entire status of the existing system just before termination of the system for fast booting. However, embodiments using the above may reduce startup-latency upon installing the system.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set-top box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A program installation and execution apparatus, comprising:
    a snapshot point setting unit configured to set a particular location on an execution sequence of a program as a snapshot point, wherein the particular location is set based upon the location within the program execution sequence of a system call;
    a dependency analysis unit configured to identify, within the program, a first function that includes the system call and a second function, which the program specifies executing after the first function, that does not include a system call;
    a rearrangement unit configured to rearrange execution of the second function to occur before execution of the first function;
    a processor configured to perform the rearranged execution of the program up to the snapshot point; and
    a snapshot image storage unit configured to store the execution result of the program up to the snapshot point.

2. The program installation and execution apparatus of claim 1, further comprising:
    a snapshot image loading unit configured to load the execution result of the program; and
    an execution unit configured to execute a remaining part of the program after the snapshot point of the program, based on the snapshot image.

3. The program installation and execution apparatus of claim 1, wherein the snapshot point setting unit is further configured to:
    detect a part having substantial dependency on a system execution environment from the execution sequence of the program; and
    decide the location of the snapshot point, based on the detected part.

4. The program installation and execution apparatus of claim 1, wherein the snapshot point setting unit is further configured to decide the location of the snapshot point in consideration of the execution order, within the execution sequence, of an initialization function using the system call.

5. The program installation and execution apparatus of claim 4, wherein the initialization function comprises:
    global class creators executed or called before a main function is executed; and
    initialization functions of a shared library.

6. The program installation and execution apparatus of claim 1, wherein:
    the program comprises:
        an independent function having no dependency on the system execution environment; and
        a dependent function having dependency on the system execution environment; and
    the rearrangement unit is further configured to adjust the execution orders, within the execution sequence, of the independent function and the dependent function such that the independent function is executed or called before the dependent function.

7. The program installation and execution apparatus of claim 1, wherein the program comprises an installed program or an updated program.

8. The program installation and execution apparatus of claim 1, wherein the execution result of the program comprises at least one of registry information and memory information of the program executed up to the snapshot point.

9. The program installation and execution apparatus of claim 1, wherein the execution result of the program is stored in a non-volatile memory.

10. A program compiler, comprising:
    a dependency analysis unit configured to identify, within a program, a first function that includes a system call and a second function, which the program specifies executing after the first function, that does not include a system call; and
    a rearrangement unit configured to rearrange execution of the second function to occur before execution of the first function, during an execution of the program.

11. A program installation and execution method, comprising:
    setting a snapshot point to a particular location of an execution sequence of a program, based upon the location within the execution sequence of a system call;
    identifying, within the program, a first function that includes the system call and a second function, which the program specifies executing after the first function, that does not include a system call;
    rearranging execution of the second function to occur before execution of the first function;
    performing the rearranged execution of the program up to the snapshot point; and
    storing the execution result of the program up to the snapshot point.

12. The program installation and execution method of claim 11, further comprising:
    loading the execution result of the program; and
    executing the remaining part of the program after the snapshot point of the program, based on the loaded execution result of the program.

13. The program installation and execution method of claim 11, wherein the setting of the snapshot point comprises:
    detecting a part having substantial dependency on a system execution environment from the execution sequence of the program; and
    deciding the location of the snapshot point based on the detected part.

14. The program installation and execution method of claim 11, wherein the setting of the snapshot point comprises deciding the location of the snapshot point in consideration of the execution order, within the execution sequence, of an initialization function using the system call.

15. The program installation and execution method of claim 14, wherein the initialization function comprises:
    global class creators executed or called before a main function is executed; and
    initialization functions of a shared library.

16. The program installation and execution method of claim 11, wherein:
    the program comprises:
        an independent function having no dependency on a system execution environment; and
        a dependent function having dependency on the system execution environment; and the setting of the snapshot point comprises deciding the location of the snapshot point after adjusting execution orders, within the execution sequence, of the independent function and the dependent function such that the independent function is executed or called before the dependent function.

17. The program installation and execution method of claim 11, wherein the program comprises an installed program or an installed, updated program.

18. The program installation and execution method of claim 11, wherein the execution result of the program comprises registry information and memory information of the program executed up to the snapshot point.

19. The program installation and execution method of claim 11, wherein the execution result of the program is stored in a non-volatile memory.

20. The program installation and execution method of claim 11, wherein the program is executed upon installation of the program to create the snapshot image at an arbitrary time after relocation of the program.

21. The program installation and execution method of claim 11, wherein existing snapshot images are updated and recreated in response to the program being updated.

22. The program installation and execution method of claim 11, wherein existing snapshot images are invalidated in response to the program being updated.

23. The program installation and execution method of claim 11, wherein a programmer is permitted to correct a source and provide a hint for identifying the occurrence timing of the system call.

24. The program installation and execution method of claim 11, wherein the occurrence location of the system call is identified using a source/binary static analysis tool.

25. The program installation and execution method of claim 11, wherein the occurrence of the system call is checked through a system call interface of an operating system.

26. The program installation and execution method of claim 11, wherein initialization functions are relocated to delay the snapshot timing.

27. The program installation and execution method of claim 11, wherein a programmer is permitted to correct and newly build a source in order to relocate initialization functions.

28. The program installation and execution method of claim 11, wherein an automation tool is newly built using a static analysis tool in order to relocate initialization functions.

29. The program installation and execution method of claim 11, wherein a program binary is corrected to relocate initialization functions.

30. The program installation and execution method of claim 11, wherein the snapshot image is recreated upon restarting in response to the snapshot image having been invalidated.

31. A non-transitory computer-readable information storage medium storing instructions that when executed by a computer cause the computer to implement a program installation and execution method comprising:
    setting a snapshot point to a particular location of an execution sequence of a program, based upon the location within the execution sequence of a system call;
    identifying, within the program, a first function that includes the system call and a second function, which the program specifies executing after the first function, that does not include a system call;
    rearranging execution of the second function to occur before execution of the first function;
    performing the rearranged execution of the program up to the snapshot point; and
    storing the execution result of the program up to the snapshot point.

32. The computer-readable information storage medium of claim 31, further comprising:
    loading the execution result of the program; and
    executing the remaining part of the program after the snapshot point of the program, based on the loaded execution result of the program.

33. The computer-readable information storage medium of claim 31, wherein the setting of the snapshot point comprises:
    detecting a part having substantial dependency on a system execution environment from the execution sequence of the program; and
    deciding the location of the snapshot point based on the detected part.

34. The computer-readable information storage medium of claim 31, wherein the setting of the snapshot point comprises deciding the location of the snapshot point in consideration of the execution order, within the execution sequence, of an initialization function using the system call.

35. The computer-readable information storage medium of claim 34, wherein the initialization function comprises:
    global class creators executed or called before a main function is executed; and
    initialization functions of a shared library.

36. The computer-readable information storage medium of claim 31, wherein:
    the program comprises:
        an independent function having no dependency on a system execution environment; and
        a dependent function having dependency on the system execution environment; and
    the setting of the snapshot point comprises deciding the location of the snapshot point after adjusting execution orders, within the execution sequence, of the independent function and the dependent function such that the independent function is executed or called before the dependent function.

37. The computer-readable information storage medium of claim 31, wherein the program comprises an installed program or an installed, updated program.

38. The computer-readable information storage medium of claim 31, wherein the execution result of the program comprises registry information and memory information of the program executed up to the snapshot point.

39. A program execution apparatus, comprising:
    a snapshot point setting unit configured to set a particular location on an execution sequence of a program to a snapshot point, wherein the particular location is set based upon the location within the program execution sequence of a system call;
    a dependency analysis unit configured to identify, within the program, a first function that includes the system call and a second function, which the program specifies executing after the first function, that does not include a system call;
    a rearrangement unit configured to rearrange execution of the second function to occur before execution of the first function;
    a processor configured to perform the rearranged execution of the program up to the snapshot point;
    a memory to store the execution result of the program up to the snapshot point; and an execution unit configured to perform the rearranged execution of a remaining portion of the program after the snapshot point of the program.

40. The program execution apparatus of claim 39, wherein:
the program comprises:
an independent function having no dependency on a system execution environment; and
a dependent function having dependency on the system execution environment; and
the rearrangement unit is further configured to adjust execution orders, within the execution sequence, of the independent function and the dependent function such that the independent function is executed or called before the dependent function.

41. The program installation and execution apparatus of claim 39, wherein the program comprises an installed program or an updated program.

42. The program installation and execution apparatus of claim 41, wherein the execution result of the program comprises at least one of registry information and memory information of the program executed up to the snapshot point.

43. The program installation and execution apparatus of claim 39, wherein the execution result of the program is stored in a non-volatile memory.

44. A program execution method, comprising:
setting a snapshot point to a particular location of an execution sequence of a program, based upon the location within the execution sequence of a system call;
identifying, within the program, a first function that includes the system call and a second function, which the program specifies executing after the first function, that does not include a system call;
rearranging execution of the second function to occur before execution of the first function;
performing the rearranged execution of the program up to the snapshot point; and
executing a remaining portion of the program after the snapshot point of the program.

45. The program execution method of claim 44, wherein:
the program comprises:
an independent function having no dependency on a system execution environment; and
a dependent function having dependency on the system execution environment; and
adjusting execution orders, within the execution sequence, of the independent function and the dependent function such that the independent function is executed or called before the dependent function.

46. The program execution method of claim 44, wherein the program comprises an installed program or an updated program.

47. The program execution method of claim 44, wherein the execution result of the program comprises at least one of registry information and memory information of the program executed up to the snapshot point.

* * * * *